(12) United States Patent
Mazeau et al.

(10) Patent No.: US 11,300,678 B2
(45) Date of Patent: Apr. 12, 2022

(54) METHOD OF HIGH-RESOLUTION DISTANCE PROCESSING

(71) Applicant: THALES, Courbevoie (FR)

(72) Inventors: Thierry Mazeau, Merignac (FR); Patrick Garrec, Merignac (FR)

(73) Assignee: THALES, Courbevoie (FR)

( * ) Notice: Subject to any disclaimer, the term of this patent is extended or adjusted under 35 U.S.C. 154(b) by 478 days.

(21) Appl. No.: 16/528,219

(22) Filed: Jul. 31, 2019

(65) Prior Publication Data

US 2020/0041642 A1 Feb. 6, 2020

(30) Foreign Application Priority Data

Aug. 2, 2018 (FR) ...................................... 1800838

(51) Int. Cl.
*G01S 13/935* (2020.01)
*G01S 13/34* (2006.01)
*G01S 7/35* (2006.01)

(52) U.S. Cl.
CPC ............ *G01S 13/935* (2020.01); *G01S 7/352* (2013.01); *G01S 13/343* (2013.01); *G01S 13/345* (2013.01); *G01S 7/356* (2021.05)

(58) Field of Classification Search
CPC .... G01S 13/935; G01S 13/343; G01S 13/345; G01S 7/356; G01S 7/352
See application file for complete search history.

(56) References Cited

U.S. PATENT DOCUMENTS

2018/0252797 A1* 9/2018 Frick ..................... G01S 7/0234

FOREIGN PATENT DOCUMENTS

EP  2 339 369 A1  6/2011
EP  2 605 037 A1  6/2013
(Continued)

*Primary Examiner* — Vladimir Magloire
*Assistant Examiner* — Nazra Nur Waheed
(74) *Attorney, Agent, or Firm* — BakerHostetler

(57) ABSTRACT

The method carries out a measurement of the distance from the ground of an aircraft by undertaking the emission of waveforms making it possible to obtain, after demodulation, of the signals received in return and sampling of the demodulated signals at a frequency $F_{éch}$, two signals $E^*_0(t)$ and $E^*_1(t)$, taking the form of two frequency ramps, of respective slopes $K_0$ and $K_1$, of respective passbands $B_0$ and $B_1$ and of respective durations $T_{E0}$ and $T_{E1}$, the N-point FFT spectral analysis of which is carried out. The values of the durations $T_{E0}$ and $T_{E1}$ as well as those of the passbands $B_0$ and $B_1$, are defined in such a way as to be able to determine, on the basis of the spectra of the signals $E^*_0(t)$ and $E^*_1(t)$, a measurement of non-ambiguous distance $d_1$ covering the maximum distance $d_{max}$ to be instrumented and an ambiguous distance $d_0$ exhibiting the desired distance resolution. The distance d to be measured being determined by combining these two measurements.

10 Claims, 8 Drawing Sheets

(56) References Cited

FOREIGN PATENT DOCUMENTS

| EP | 2605037 A1 | * | 6/2013 | ........... G08G 5/0086 |
| EP | 3 121 619 A1 | | 1/2017 | |
| GB | 2 248 359 A | | 4/1992 | |
| GB | 2248359 A | * | 4/1992 | ........... G01S 13/343 |

* cited by examiner

METHOD OF HIGH-RESOLUTION DISTANCE PROCESSING

CROSS-REFERENCE TO RELATED APPLICATIONS

This application claims priority to foreign French patent application No. FR 1800838, filed on Aug. 2, 2018, the disclosure of which is incorporated by reference in its entirety.

FIELD OF THE INVENTION

The invention pertains to the general field of airborne systems, helicopters or aircraft with (aeroplanes) or without (drones) a pilot for example.

It pertains more particularly to the distance and speed measurements carried out by a radar embedded on board one or the other of these craft.

BACKGROUND

To carry out a measurement of distance by means of an airborne radar it is known to adopt a mode of operation implementing a waveform constituted by a recurrent emission, of emission duration $T_E$, linearly modulated in frequency over time. Indeed, such a waveform makes it possible in a known manner to determine, in a simple manner, the delay $\tau$ between the signal emitted e(t) and the signal received r(t), by considering the corresponding time-frequency representations.

The basic principle of such a mode of operation is illustrated by FIG. 1. This principle consists in emitting a signal $e_0(t)$ whose frequency exhibits a positive linear variation during the first half of a time interval TE and a signal $e_1(t)$ whose frequency exhibits a negative linear variation during the second half of the same time interval; the frequency of the signal emitted varying in a band B.

The radioelectric signal emitted $e_0(t)$, radiated by an antenna in the direction of the ground, is here linearly modulated in frequency as a function of time, so that it is expressed by:

$$e_0(t)=e^{i2\pi K t^2} \quad [1]$$

with $$K = \frac{B}{T_E},$$

B representing the frequency band emitted and $T_E$ the emission time, or illumination time.

Likewise, the signal $r_0(t)$, reflected by the ground subsequent to this emission and received by the radar, is a signal likewise linearly modulated in frequency, whose frequency varies over a band B, which exhibits, with respect to the signal emitted $e_0(t)$, a time shift, a delay, $\tau$, and a shift in frequency $f_D$ due to the Doppler effect engendered by the motion of the carrier, which are functions of the distance d separating the radar from the ground.

Hence, the general expression for the reflected signal received by the radar is:

$$r_0(t)=e^{i \cdot 2 \cdot \Pi(K(t-\tau)+fD)t}=e_0(t) \cdot e^{i \cdot 2 \cdot \Pi(-K\tau+fD)t} \quad [2]$$

So that the transpositions obtained after mixing of $r_0(t)$ and $e_0(t)$ are expressed by:
$r_0(t) \cdot e_0(t)$ which will be eliminated after filtering
and $$\frac{r_0(t)}{e_0(t)} = e^{i \cdot 2 \cdot \Pi(-K\tau+f_D)t} \quad [3]$$

In a known manner, the delay $\tau$ of r(t) with respect to e(t) is equal to $$\tau = \frac{2 \cdot d}{c}$$

where c represents the speed of light in vacuo.

The signals $e_1(t)$ and r1(t) exhibit for their part, respectively, expressions similar to $e_0(t)$ and $r_0(t)$ by means of a temporal translation equal to $T_E/2$.

In a representation in the time/frequency plane the signal e(t) can be defined, for instants lying between 0 and $T_E/2$, by the following normalized equation:

$$E_0(t)=Kt \quad [4]$$

$E_0(t)$ represents the value of the frequency of the signal e(t) at the instant t considered. It takes the form of a frequency ramp with a coefficient K.

In an analogous manner, the signal r(t) can be defined, for instants lying between 0 and $T_E/2$, by the following normalized equation:

$$R_{0(t)}=K(t-\tau)+f_D \quad [5]$$

$R_0(t)$ represents the value of the frequency of the signal $r_0(t)$ at the instant t considered. It takes the form of a frequency ramp similar to $E_0(t)$ but shifted by a time interval $\tau$ on the x-axis (abscissa axis) and by a frequency $f_D$ on the y-axis (frequency axis); $\tau$ representing the delay related to the distance d between the radar and the ground and $f_D$ the Doppler frequency.

In this time/frequency representation, the difference between the signal received $R_0(t)$ and the signal emitted $E_0(t)$ therefore appears as a constant frequency magnitude equal to:

$$\Delta F_0 = -K \cdot \tau + f_D \quad [6]$$

In an analogous manner, the signals $e_1(t)$ and $r_1(t)$ can be defined, for instants lying between $T_E/2$ and $T_E$, by the following normalized equations:

$$E_1(t)=-Kt+B \quad [7]$$

and $$R_{1(t)}=-K \cdot (t-\tau)+B+f_D \quad [8]$$

$E_1(t)$ therefore takes the form of a frequency ramp falling from a value B with a coefficient K and $R_1(t)$ in the form of a frequency ramp similar to $E_1(t)$ but shifted by a time interval $\tau$ on the x-axis (abscissa axis) and by a frequency $f_D$ on the y-axis (frequency axis).

The difference between the signal received R1(t) and the signal emitted E1(t) therefore appears as a constant frequency magnitude equal to:

$$\Delta F_1 = K \cdot \tau + f_D \quad [9]$$

Hence, by considering relations [6] and [9], we may write:

$$S = \Delta F_1 + \Delta F_0 = 2 f_D \qquad [10]$$

$$E = \Delta F_1 - \Delta F_0 = 2K \cdot \tau \qquad [11]$$

Thus, if these magnitudes E and S are considered, it is noted that their measurements advantageously make it possible to determine respectively the Doppler frequency $F_D$ and the delay $\tau$.

However, in the context of the present invention, one is concerned only with the determination of the distance, through $\tau$, so that only relation [13] is exploited.

It should be noted here that the magnitudes $E_i(t)$, $R_i(t)$, $\Delta F_i$, S and E are dimensionally equivalent to frequencies and that E, difference of frequencies, is always positive since it is proportional to distance.

The expression for e(t) in the amplitude/time domain is given by the following relation:

$$e(t) = A e^{-i 4\pi K \tau t} \qquad [12]$$

where $4\pi K\tau$ represents $2\pi$ times the frequency of variation of E

In practice the signals $\Delta F_1$ and $\Delta F_0$ are sampled with a frequency $F_{éch}$. The signal $e^* = e(n \cdot T_{éch})$, obtained by subtraction of the samples of $\Delta F_1(n \cdot T_{eéch})$ and $\Delta F_0(n \cdot T_{éch})$, consists of a sequence of samples e*, and can form the subject of a spectral decomposition, for example by FFT, the spectrum formed consisting of frequency samples denoted $E_{(F)}^*$.

Hence, the determination of the spectrum of the signal e* makes it possible to determine the frequency, $K\tau$, of the signal e* and hence the delay $\tau$ and therefore the distance d that one wishes to measure.

It is recalled, however, as illustrated by FIG. 2, that the spectrum of the signal e*, signal e(t) sampled at the frequency $F_{éch}$, takes the form of an elementary spectrum of width equal to $F_{éch}$, replicated in the frequency space with a periodicity equal to $F_{éch}$.

Hence, the spectral decomposition of e* makes it possible to determine, in a non-ambiguous manner, the spectrum of frequencies (the central frequency) of the signal $E_{(F)}^*$ provided that the frequency band occupied by $E_{(F)}^*$ is less than $F_{éch}/2$.

If the frequency band occupied by $E_{(F)}^*$ is greater than this value, then, in a known manner, an aliasing of the spectrum of $E_{(F)}^*$ in a band $[-F_{éch}/2, F_{éch}/2]$ replicated periodically around frequencies which are multiples of the frequency $F_{éch}$ is seen. In the latter case the frequency of the signal e* (and therefore the delay $\tau$) can only be determined modulo $F_{éch}$.

To circumvent ambiguity problems generated by the sampling of the signal e*, a known solution consists in increasing the sampling frequency $F_{éch}$ so as to ensure that, for the spectral resolution considered, the ambiguous frequency is situated beyond the maximum frequency of the signal e*.

However, such a way of proceeding makes it necessary to increase the number of coefficients of the FFT that is used for the spectral decomposition, and therefore to process a more sizable number of signal samples, failing which a degradation in the frequency resolution (and therefore in the distance resolution) of the spectral response obtained is seen. However, such a rise in the calculational load makes it necessary to have sufficient calculational capabilities to carry out, in the time available, an FFT calculation on a number of sufficient points.

Hence, according to the value of the frequency f of the signal e*, it is sometimes difficult, without having the necessary calculational capabilities, to carry out a measurement of distance over a given distance span with a satisfactory resolution, on the basis of the simple FFT spectral decomposition of the signal e* described above.

In such a context, one is constrained to use an alternative determination scheme, or to implement complementary processing steps.

The European patent application filed by the applicant and published under the reference EP2605037A1 proposes an alternative measurement scheme to that described above, which implements three separate emission/reception pathways; the signal processed by each pathway, constructed by repeating a signal of duration $T_E$ consisting of a positive frequency ramp of duration $T_E/2$ followed by a negative ramp of duration $T_E/2$, being sampled and decomposed spectrally.

SUMMARY OF THE INVENTION

An aim of the invention is to propose a solution, based on the emission of frequency ramps, making it possible to take advantage of the use of a simple mode of operation to measure the radar-ground distance by simple FFT spectral analysis of the sampled signal e* described above, resulting from the mixing of the signal received r(t) and of the signal emitted e(t), while making it possible to circumvent the drawbacks caused by possible distance ambiguities resulting from the sampling at $F_{éch}$.

The appearance of ambiguities is caused by the compromise that has to be made between the use of a sampling frequency sufficient to avoid any spectral ambiguity, the number of measurements on which the FFT must be performed to obtain the desired spectral resolution and the calculational capability available to perform an FFT on the desired number of points.

To this effect the subject of the invention is a method for determining in real time the distance, d, from the ground of an aircraft by radar measurements, the said distance d being determined, for a span of distances extending up to a given distance $d_{max}$, with a given constant resolution $R_{d0}$.

The method according to the invention implements the following operations:

the emission of at least two successive frequency ramps and the reception of the signals reflected by the ground subsequent to these emissions;

the construction, on the basis of the reflected signals received, of two signals $E_0(t)$ and $E_1(t)$ each corresponding to the reflected signal $r_0(t)$ or $r_1(t)$ originating from the successive emissions of two waveforms $e_0(t)$ and $e_1(t)$, after demodulation of the signals $r_0(t)$ and $r_1(t)$ by the corresponding wave $e_0(t)$ or $e_1(t)$ and sampling of the demodulated signal at a given frequency $F_{éch}$;

the said waveforms $e_0(t)$ and $e_1(t)$ being represented in a "time-frequency" space by two frequency ramps exhibiting respective slopes of variation $K_0$ and $K_1$, on two frequency bands $B_0$ and $B_1$ whose ratio $B_1/B_0$ is a given integer number, the band $B_0$ being determined as a function of the distance resolution $R_{d0}$ by the relation:

$$B_0 = c/2R_{d0},$$

the slope $K_1$ being determined as a function of the distance $d_{max}$ by the relation:

$$K_1 = \frac{c}{2} \cdot \frac{F_{éch}}{2\alpha \cdot d_{1max}};$$

the slopes $K_0$ and $K_1$ being respectively given by the relations $$K_0 = B_0/T_{E0} \text{ and } K_1 = B_1/T_{E1}$$

where $T_{E0}$ and $T_{E1}$ represent the respective durations of emission of the waveforms $e_0(t)$ and $e_1(t)$, the application of an FFT, on N samples, to the signals $E_0(t)$ and $E_1(t)$ and the determination of the spectral components $E_0$ and $E_1$ corresponding to the said signals, $E_0$ corresponding to the component of lowest frequency of the spectrum of $E_0(t)$;

the determination, on the basis of the spectral components $E_0$ and $E_1$, of the distances measured $d_0$ and $d_1$ by means of the waveforms $e_0(t)$ and $e_1(t)$ corresponding respectively to the spectral components $E_0$ and $E_1$, $d_0$ and $d_1$ being given by the relations:

$$d_0 = \frac{c}{2} \cdot \frac{E_0}{\alpha K_0} \text{ and } d_1 = \frac{c}{2} \cdot \frac{E_1}{\alpha K_1}$$

the determination, on the basis of $d_0$ and $d_1$, of the distance d to be measured, d being given by the relation:

$$d = M \cdot d_{0max} + d_0$$

with $$d_{0max} = \frac{c}{2} \cdot \frac{F_{0max}}{\alpha K_0} = \frac{c}{2} \cdot \frac{F_{éch}}{2\alpha K_0}$$

and $$M = INT\left(\frac{d_1}{d_{0max}}\right) = INT(2 \cdot E_1 \cdot T_{éch}).$$

According to a preferred mode of implementation, the method according to the invention mainly comprises the following steps:

a first step during which are determined the slopes $K_0$ and $K_1$, and frequency bands $B_0$ and $B_1$ characterizing the two signals $e_0(t)$ and $e_1(t)$ as well as the durations of emission $T_{E0}$ and $T_{E1}$ of these two signals; this first step being carried out while taking into account the following parameters:
  maximum distance measured: $d_{max}$,
  distance resolution required: $R_{d0}$,
  frequency of sampling of the signals received by the radar: $F_{éch}$,
  number N of points on which the spectral decomposition of the signals must be performed;
a second emission step during which:
  the radar emits at least two waves corresponding to a chosen type of emission, at least one of these waves consisting of a frequency ramp of band $B_0$ and of slope $K_0$;
  the radar receives the reflected signals resulting from the reflection by the ground of the emitted waves;
  the signals $E_0(t)$ and $E_1(t)$ are formed on the basis of the reflected signals received;

a third step during which is carried out the spectral decomposition by FFT on N points of the signals $E_0(t)$ and $E_1(t)$ and the determination of the spectral components $E_0$ and $E_1$;

a fourth step during which is carried out the calculation of the distance d on the basis of $E_0$ and $E_1$.

Moreover, according to various provisions that can each be considered separately or that can be considered in combination, the method according to the invention can moreover exhibit the technical characteristics hereinafter.

Thus, according to a particular provision, the fourth step comprises:

a first sub-step of calculating the distance $d_1$ defined by:

$$d_1 = \frac{c}{2} \cdot \frac{G_1}{\alpha K_1}$$

where $G_1$ represents the integer part of the spectrum of $E1(t)$ a second sub-step of calculating the scale factor M defined by:

$$M = INT\left(\frac{2E_1}{F_{éch}}\right);$$

a third sub-step of calculating the distance $d_0$ defined by:

$$d_0 = \frac{c}{2} \cdot \frac{H_0}{\alpha K_0}$$

where $H_0$ represents the integer part of the value of the first spectral line, $E_0$, of the spectrum of $E0(t)$;

a fourth sub-step of calculating the distance d, defined by:

$$d = M \cdot d_{0max} + d_0.$$

According to another particular provision, the waveforms emitted by the radar in the course of the second step of the method consist of a first frequency ramp $e_0(t)$ of band $B_0$ and of slope $K_0$ followed by a second frequency ramp $e_1(t)$ of band $B_1$ and of slope $K_1$.

According to a particular provision, the signal $e_0(t)$ and the signal $e_1(t)$ have distinct durations of respective emission $T_{E0}$ and $T_{E1}$ and occupy one and the same frequency band B, so that their respective slopes $K_0$ and $K_1$ are expressed by:

$$K_0 = \frac{B}{T_{E0}} \text{ and } K_1 = \frac{B}{T_{E1}}.$$

According to another particular provision, the signals $E_0(t)$ and $E_1(t)$ are obtained after demodulation of the signals received $r_0(t)$ and $r_1(t)$ by the signals emitted $e_0(t)$ and $e_1(t)$, the signals $E_0(t)$ and $E_1(t)$ being thereafter sampled in the course of the third step at the frequency $F_{éch}$ so as to obtain the signals $E^*_0(t)$ and $E^*_1(t)$, the FFT spectral analysis of which is carried out.

According to another particular provision, the waveforms emitted by the radar in the course of the second step of the method consist of a recurrent string of N identical frequency ramps $e_0(t-nT_{E0})$, mutually shifted in time by a duration $T_{E0}$ equal to the emission time of a ramp, of band B and of duration $T_{E0}$.

According to another particular provision, for each of the N frequency ramps emitted, the signal the signal $E_0(t)$ obtained by demodulation of the signal received by the signal emitted is sampled to obtain the corresponding signal $E^*_0(t)$, and then a signal $E^*_1(t)$ is constructed by considering a sample of the signal $E^*_0(t)$ formed for each of the N ramps emitted, the signal $E^*_1(t)$ consisting of the N samples thus tapped off.

According to another particular provision, for the nth frequency ramp $e_0(t)$ emitted the signal received $r_0(t)$ is demodulated by applying a phase shift equal to $$n \cdot \frac{2 \cdot \pi}{N}$$

to the local oscillator of the radar receiver.

According to another particular provision, for each of the N signals $E^*_0(t)$ formed, one taps off the sample corresponding the instant $t_n$ determined by the expression:

$$t_n = n \cdot T_{E0} + n \cdot \frac{T_{E0}}{N},$$

in which n represents the rank, in the ramp string of frequency ramps emitted, of the frequency ramp n corresponding to the signal $E^*_0(t)$ considered.

From a functional point of view, the method thus carries out a measurement of the distance d from the ground of an aircraft, with a given distance resolution $R_{d0}$ and for a measurement span extending up to a given distance dmax, by proceeding in the manner of a vernier exhibiting a main measurement scale allowing a measurement $d_1$ of distance over the desired span of values (from 0 to $d_{max}$) with a given resolution $R_{d1}$ and a complementary measurement scale making it possible to correct the previous distance measurement by means of a measurement $d_0$, valid over a span of distances $d_{0max}$ which is smaller than $d_{max}$, obtained with the desired resolution.

BRIEF DESCRIPTION OF THE DRAWINGS

The characteristics and advantages of the invention will be better appreciated by virtue of the description which follows, which description is supported by the appended figures which present.

Figure 1:
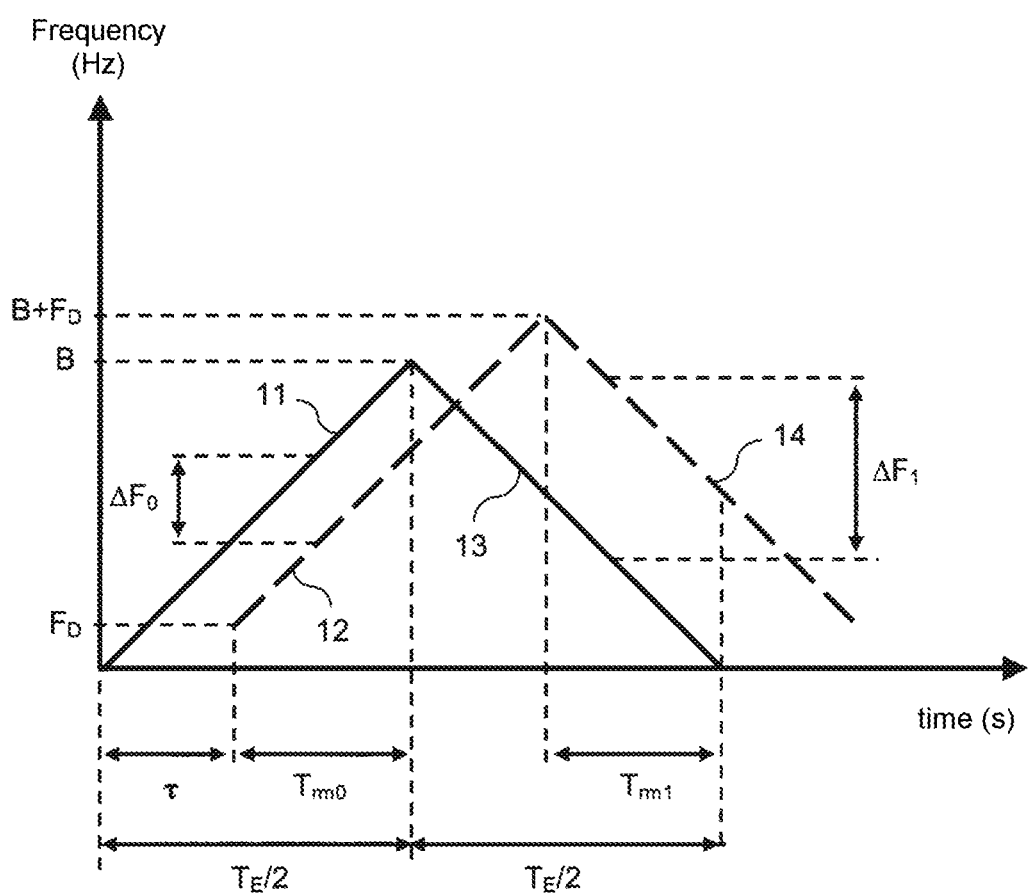
FIG. 1, a simultaneous representation in a time-frequency frame of an emission signal in rising and falling double frequency ramp form and of the signal received by the radar after reflection on the ground.
Figure 2:
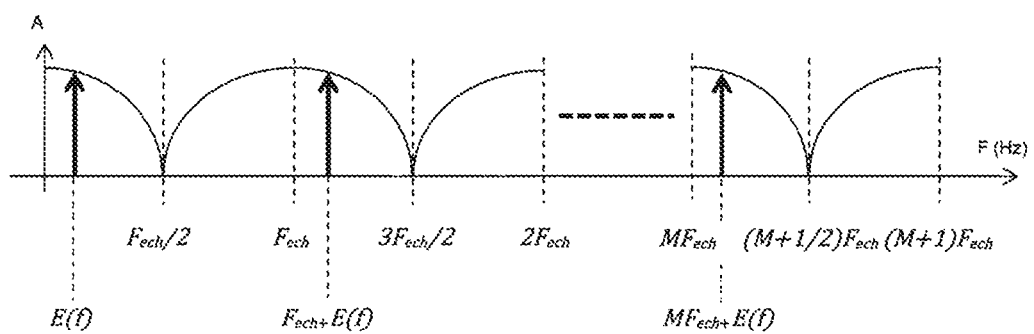
FIG. 2, a frequency representation illustrating the phenomenon of frequency ambiguity that may be caused by the sampling at a frequency $F_{\acute{e}ch}$ of the signal e(t) resulting from a waveform such as that illustrated by FIG. 1.

It should be noted that, in the appended figures, one and the same functional or structural element bears, preferably, one and the same reference symbol.

DETAILED DESCRIPTION

As stated above, the method according to the invention implements the principle consisting in emitting a type of simple waveform consisting of successive frequency ramps and in determining the distance d which separates the aircraft from the ground by calculating the frequency gap and the delay existing between the signal e(t) (a frequency ramp) emitted by the radar and the signal r(t) reflected by the ground and received by this same radar.

Accordingly, the method according to the invention implements a processing comprising the operations described hereinafter, by considering the signal E(t) obtained as indicated above:

$$E(t) = \frac{r(t)}{e(t)} = e^{i \cdot 2 \cdot \Pi(-K\tau + f_D)t},$$

whose representation in a time-frequency space is defined by the following relation $$\Delta F = -K\tau + F_D$$

According to the invention, the signal $\Delta F$ is sampled at the frequency $F_{\acute{e}ch}$ so that the signal $e^* = e(n \cdot T_{\acute{e}ch})$ obtained after sampling consists of M samples.

The signal $e^*$ thereafter forms the subject of a spectral decomposition, by FFT on N points in a preferential manner, the spectrum $E^*(F)$ thus formed consisting of N frequency samples.

It should be noted that the signal thus formed is considered to be essentially dependent on the delay $\tau$, the frequency $f_D$ being considered to be generally negligible despite choosing in this regard the slope of variation K of the frequency ramp emitted.

The operations described above are executed by successively considering two values of slope of variation $K_0$ and $K_1$ in such a way that two spectra $E^*_0(F)$ and $E^*_1(F)$ are obtained after execution. These two spectra are thereafter utilized jointly.

According to the invention, the slopes $K_0$ and $K_1$ of the signals considered are determined by taking into account the measurement requirements consisting of the maximum distance value $d_{max}$, as well as the distance resolution $R_{d0}$ desired for the distance measurement performed. The slope $K_0$ is determined in such a way as to obtain a signal $E_0(t)$ whose passband makes it possible to obtain the desired distance resolution, while the slope $K_1$ is determined in such a way as to measure distance values d extending up to a value $d_{max}$. Hence the slope $K_1$ is of value lower than the slope $K_0$.

These two slopes are moreover determined by various functional parameters, related to the hardware operation of the device which carries out the calculation of the distance d:

the period $T_{\acute{e}ch}$ of the signals sampling clock which determines, in a known manner, the maximum frequency of the spectrum of the signal samplable without aliasing: $F_{max} = \frac{1}{2} \cdot T_{\acute{e}ch}$;

the number of points N on which the FFT spectral decomposition is calculated. This number of points determines the frequency resolution $r_{f0}$ of the spectrum of the signal $E_0(t)$ or $E_1(t)$ considered.

Figure 3:
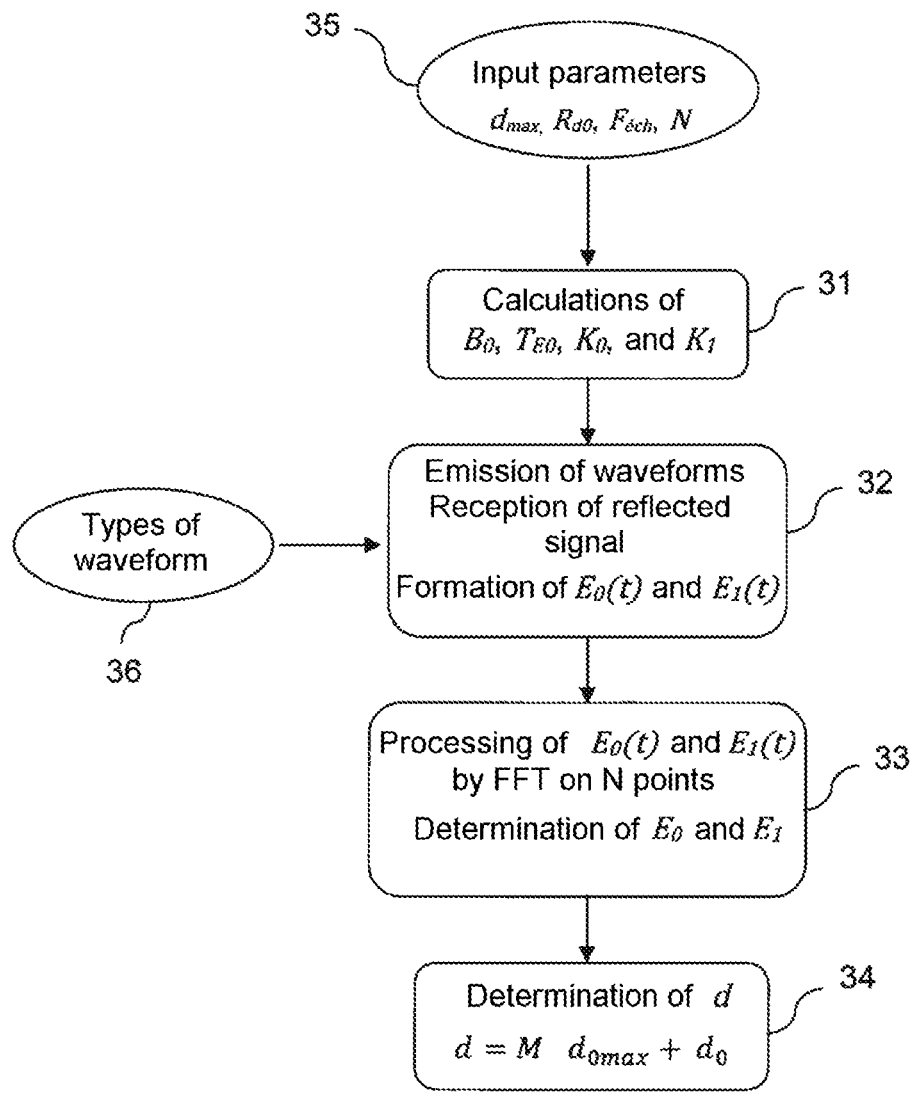
FIG. 3, a basic flowchart of the various steps of the method according to the invention.

As illustrated by the schematic of FIG. 3, the method according to the invention mainly comprises four steps.

In the course of a first step 31, the method according to the invention utilizes the parameters cited above to determine the values of the slopes $K_0$ and $K_1$ and the bands $B_0$ and $B_1$ corresponding to the frequency variations of the signals $E_0(t)$ and $E_1(t)$ exhibiting the desired characteristics.

Accordingly, it executes in particular the following operations:

1) Calculation of the band $B_0$ of the signal $E_0(t)$.

In a known manner, $B_0$ is determined as a function of the distance resolution desired by the relation:

$$B_0 = \frac{c}{2 \cdot R_{D0}} \quad [13]$$

2) Calculation of the duration $T_{E0}$ of the signal $E_0(t)$. $T_{E0}$ is given by:

$$T_{E0} = N \cdot T_{\acute{e}ch} \quad [14]$$

3) Calculation of the slope $K_0$:

$$K_0 = \frac{B_0}{T_{E0}} \quad [15]$$

4) Calculation of the maximum distance measurable without ambiguity $d_{0max}$ and of the corresponding delay $\tau_{0max}$.

$\tau_{0max}$ and $d_{0max}$ are given respectively by the following relations:

$$\tau_{0max} = \frac{F_{max}}{2K_0} \text{ with } F_{max} = \frac{1}{2 \cdot T_{\acute{e}ch}} \quad [16]$$

and $$d_{0max} = \frac{c \cdot F_{\acute{e}ch}}{4K_0} \quad [17]$$

5) Calculation of the slope $K_1$.

The slope $K_1$ is determined by taking account of the maximum distance to be measured $d_{max}$ and the maximum frequency of the signal $E(t)$, having regard to the sampling frequency $F_{\acute{e}ch}$. It is expressed by:

$$K_1 = \frac{F_{\acute{e}ch}}{4 \cdot \tau_{max}} = \frac{c \cdot F_{\acute{e}ch}}{8 \cdot d_{max}} \quad [18]$$

It should be noted that, $K_1$ being determined, the shape of the signal $E_1(t)$ is preferentially determined by altering the band $B_1$.

Next, in the course of a second step 32 of the method according to the invention, the radar undertakes the emission of waveforms making it possible to obtain the signals $E_0(t)$ and $E_1(t)$ and undertakes the reception of the corresponding reflected signals to form these signals $E_0(t)$ and $E_1(t)$.

As is described further on in the present description, the waveforms emitted may be of various types chosen elsewhere. However, they have the common characteristic of making it possible on the basis of the reflected signals received by the radar to form the signals $E_0(t)$ and $E_1(t)$. The type of waveform to be implemented constitutes in this regard an operating parameter taken into account in the course of this second step.

The values of $K_0$, $K_1$, $B_0$ and $B_1$ being thus determined in step 31, it is advantageously possible to determine, according to the envisaged type of frequency ramps, the characteristics of the frequency ramps to be emitted so as to obtain the signals $E_0(t)$ and $E_1(t)$.

The third step 33 of the method according to the invention implements the frequency processing of the signals $E_0(t)$ and $E_1(t)$ in such a way as to determine the components of the spectra of the signals $E_0(t)$ and $E_1(t)$ sampled at the frequency $F_{\acute{e}ch}$.

It should be noted here that, on account of the values of those operating parameters taken into account by the method according to the invention, for a given instrumented maximum distance $d_{max}$, the spectrum of $E_1(t)$ consists of a single line $E_1$, while the spectrum of $E_0(t)$ consists of a comb of lines of period $F_{\acute{e}ch}$, of which the line $F_0$ of lowest frequency lies between 0 and $$\frac{F_{\acute{e}ch}}{2}.$$

The fourth step 34 of the method according to the invention consists, for its part, of the determination on the basis of the spectra of the sampled signals $E_0(t)$ and $E_1(t)$, in determining a measurement of the distance d.

Figure 4:
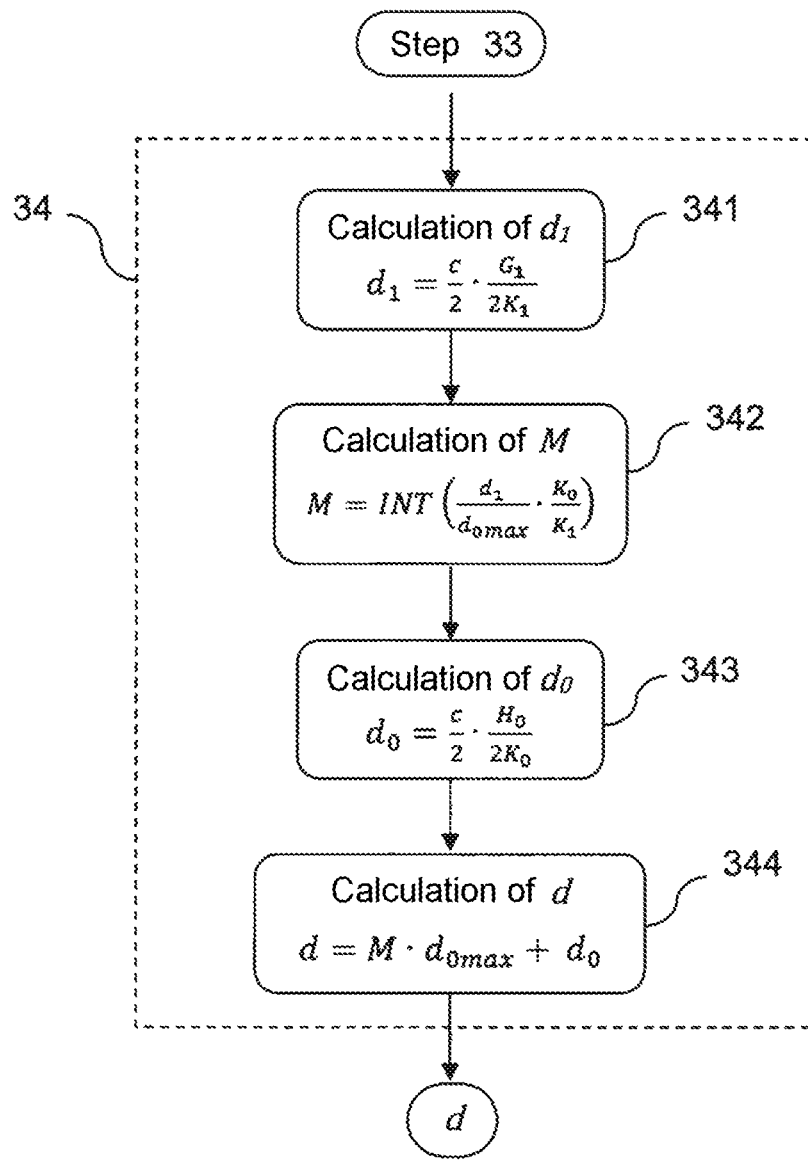
FIG. 4, a basic flowchart of the various sub-steps of the fourth step of the method according to the invention.

Accordingly, as illustrated by FIG. 4, step 34 of the method according to the invention implements various sub-steps itself.

Step 34 thus comprises a first sub-step 341 during which the signal $E_1(t)$ is used to calculate the distance $d_1$ which corresponds to the distance d measured on the basis of the signal $E_1(t)$. The distance $d_1$ is given by the following relation:

$$d_1 = \frac{c}{2} \cdot \frac{G_1}{\alpha K_1} \quad [19]$$

$G_1$ represents the integer part of the spectrum of E1(t), defined as a function of the delay $\tau$ by the relation:

$$E_1 = \alpha \cdot K_1 \cdot \tau \quad [20]$$

The distance resolution of $E_1$ being equal to $$r_{d1} = \frac{c}{2B_1}, G_1$$

represents here the value of the frequency component of $E_1$, which may be written as a function of the frequency resolution $r_{F0}$:

$$G_1 = INT\left(\frac{E_1}{r_{F0}}\right) \cdot r_{F0} \quad [21]$$

It should be noted that the distance $d_1$ advantageously gives a measurement of the distance d which is valid over the whole distance span extending up to the value $d_{max}$.

However, this distance measurement is obtained with a resolution $r_{d1}$ lower than the distance resolution $r_{d0}$ sought.

Step 34 also comprises a second sub-step 342, during which the method according to the invention calculates the factor M defined by the relation:

$$M = INT\left(\frac{E_1}{F_{max}}\right) = INT\left(\frac{2E_1}{F_{\acute{e}ch}}\right) = INT(2 \cdot E_1 \cdot T_{\acute{e}ch}) = INT\left(\frac{d_1}{d_{0max}} \cdot \frac{K_0}{K_1}\right) \quad [22]$$

where INT represents the "integer part" function

Step 34 further comprises a third sub-step 343, during which the method according to the invention determines, on the basis of the signal $E_0(t)$, the distance $d_0$ given by the following relation:

$$d_0 = \frac{c}{2} \cdot \frac{H_0}{\alpha K_0}; \quad [23]$$

$H_0$ represents the integer part of the value of the first spectral line, $E_0$, of the spectrum of E0(t) defined as a function of the delay τ by the relation:

$$E_0 = \alpha \cdot K_0 \cdot \tau \quad [24]$$

so that we may write:

$$H_0 = INT\left(\frac{E_0}{r_{F0}}\right) \cdot r_{F0} \quad [25]$$

Step 34 finally comprises a fourth sub-step 344, during which the method according to the invention calculates the value of the distance d measured, d being given by the relation:

$$d = M \cdot d_{0max} + d_0 \quad [26]$$

As was mentioned above, the waveforms emitted during step 32 can be of various types chosen elsewhere. However, they have the common characteristic of making it possible to form signals $E_0(t)$ and $E_1(t)$ defined by their respective bands $B_0$ and $B_1$ and their respective slopes of frequency variation $K_0$ and $K_1$. The type of waveform to be implemented constitutes in this regard an operating parameter taken into account in the course of this second step.

It should be noted that the main functional parameters, which determine the bands $B_0$ and $B_1$ as well as the slopes $K_0$ and $K_1$ are:
functional parameters:
the distance resolution: $R_{d0}$;
the maximum distance to be measured: $d_{1\,max}$;
parameters related to the hardware structure intended to implement the method according to the invention:
the signals sampling period, $T_{\acute{e}ch}$, which fixes the maximum frequency of the sampled signals:

$$F_{max} = \frac{1}{2 \cdot T_{\acute{e}ch}};$$

the number N of points on which the FFT is applied to the signals $E_0(t)$ and $E_1(t)$. This number N determines the frequency resolution $R_{f0}$ of the spectrum formed after FFT.

Figure 5:
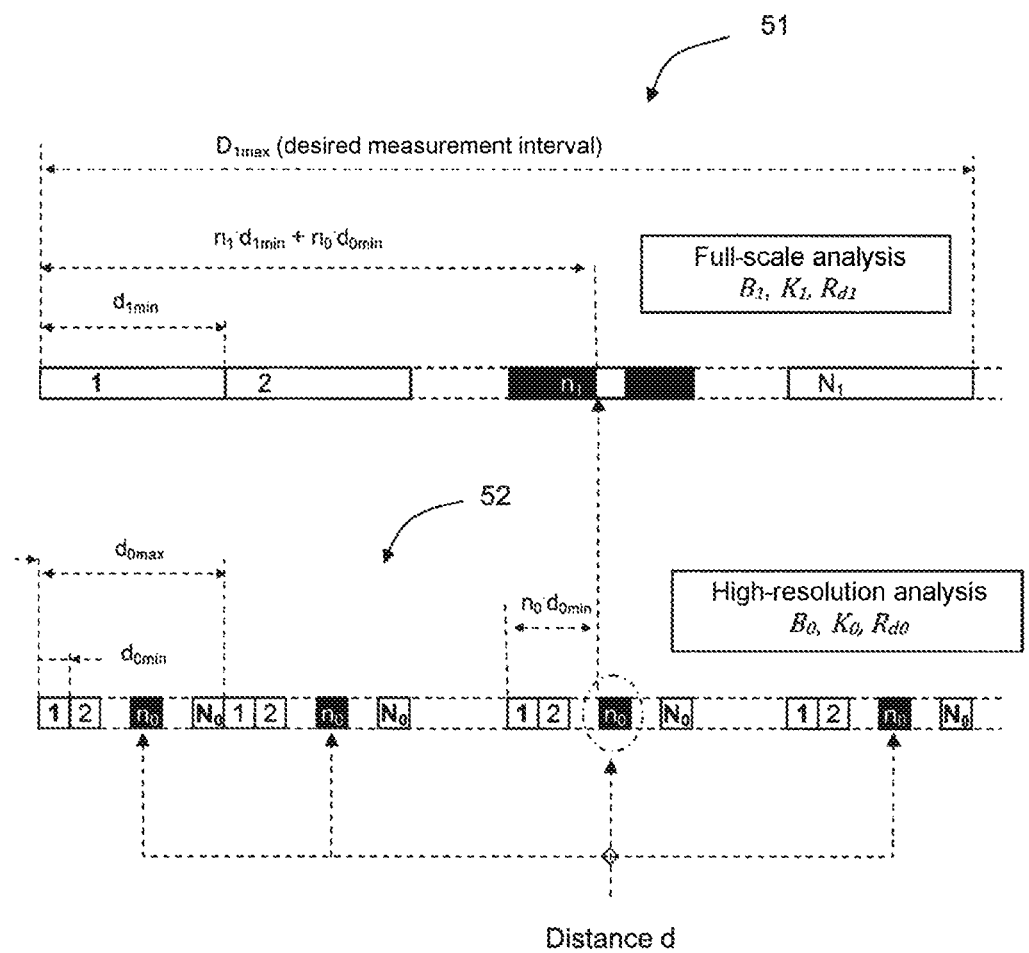
FIG. 5, an illustration of the operating principle of the method according to the invention.

The illustration of FIG. 5 makes it possible to represent from a formal point of view the operating principle of the method according to the invention, which can be considered to be an analysis of the spectrum of the signal $E_1(t)$ described above by considering two distinct, superposed, frequency references (i.e. two distance references) 51 and 52 which are multiples of one another, these two references being related to the respective values of the respective passbands $B_0$ and $B_1$ and slopes $K_0$ and $K_1$ of the emitted waveforms.

The reference 51 with the larger spacing, a spacing $$P_1\left(P_1 = R_{d1} = \frac{c}{2 \cdot B_1} = \frac{c}{2 \cdot K_1} T_E\right),$$

makes it possible to measure, with a frequency resolution corresponding to the distance resolution $R_{d1}$, which is however insufficient, the frequency E of the spectrum of the sampled signal $E(t)^*$ which actually corresponds to the frequency of the real signal $E(t)$ and therefore to the true distance d; the measured frequency E lying in a given interval of frequencies of width equal to the spacing P1.

The scale 52 with the smaller spacing, a spacing P2, makes it possible to locate the frequency E in a restricted frequency interval, corresponding to the distance resolution $R_{d0}$ desired, inside the frequency interval of width P1 including the frequency E.

In the illustration of FIG. 5 the distance scales corresponding to the frequency scales have been depicted directly.

Hereinafter in the document, two examples of waveforms that may be used for the implementation of the method according to the invention are proposed by way of example.

It should be noted that the choice of the waveforms to be emitted, which choice is made taking account of the functional parameters mentioned above, affects only the execution of the second step 32 of the method according to the invention. Accordingly, the elements of the description which relate to the exemplary implementations of the method according to the invention pertain mainly to the second step 32 of the method according to the invention.

Figure 6A:
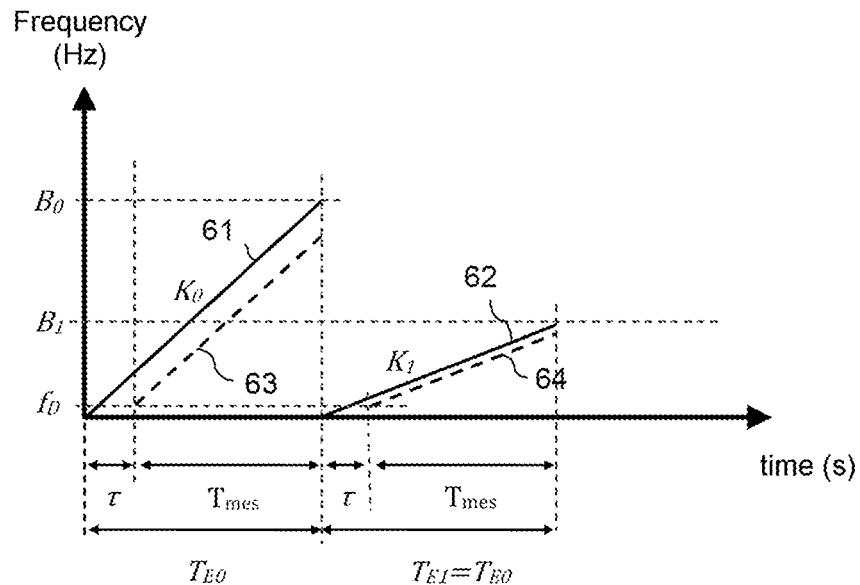
FIGS. 6a and 6b, the representations in a time-frequency frame of two variants of a first exemplary waveform allowing the implementation of the method according to the invention and of the waveforms received by the radar after reflection on the ground.

According to the first form of implementation presented here, illustrated by FIG. 6a, the emitted waveforms consist of two distinct frequency ramps 61 and 62, exhibiting slopes of variation respectively equal to $K_0$ and $K_1$, the slope $K_0$ being greater than the slope $K_1$. The first ramp 31 is a ramp of durations $T_{E0}$, whose passband takes a value $B_0$ while the second ramp 62 is a ramp of durations $T_{E1}$, equal to $T_{E0}$, whose passband takes a value $B_1$. We can therefore write:

$$K_0 = \frac{B_0}{T_{E0}} \text{ and } K_1 = \frac{B_1}{T_{E0}}$$

In this first exemplary implementation the two frequency ramps 61 and 62 are emitted successively by the radar in the course of step 62, so that the signals $E_0(t)$ and $E_1(t)$ are respectively formed directly by carrying out the demodulation by the frequency ramp 61 of the reflected signal 63 received by the radar after emission of this first frequency ramp and the demodulation by the frequency ramp 62 of the reflected signal 64 received by the radar after emission of this second frequency ramp, and then by filtering the signal produced so as to preserve only the signal $$E(t) = \frac{r(t)}{e(t)} = e^{j\cdot 2\cdot \pi(-K\tau + f_D)t}.$$

We thus obtain the signals:

$$E_0(t) = \frac{r_0(t)}{e_0(t)} = e^{j\cdot 2\cdot \pi(-K_0\tau + f_D)t} \qquad [27]$$

and $$E_1(t) = \frac{r_1(t)}{e_1(t)} = e^{j\cdot 2\cdot \pi(-K_1\tau + f_D)t} \qquad [28]$$

The signals $E_0(t)$ and $E_1(t)$ being thus obtained on the basis of the two ramps 61 and 62, the method according to the invention proceeds in the manner described above.

In the form of implementation described above, it is considered that the two frequency ramps 61 and 62 emitted have one and the same duration $T_{E0}$, so that the slopes $K_0$ and $K_1$ are obtained by altering the respective passbands $B_0$ and $B_1$ of the two ramps. Signals are thus processed that exhibit two distinct distance resolutions $R_{d0}$ and $R_{d1}$ of which $R_{d0}$ represents the distance resolution sought for the calculation of the distance d.

Figure 6B:
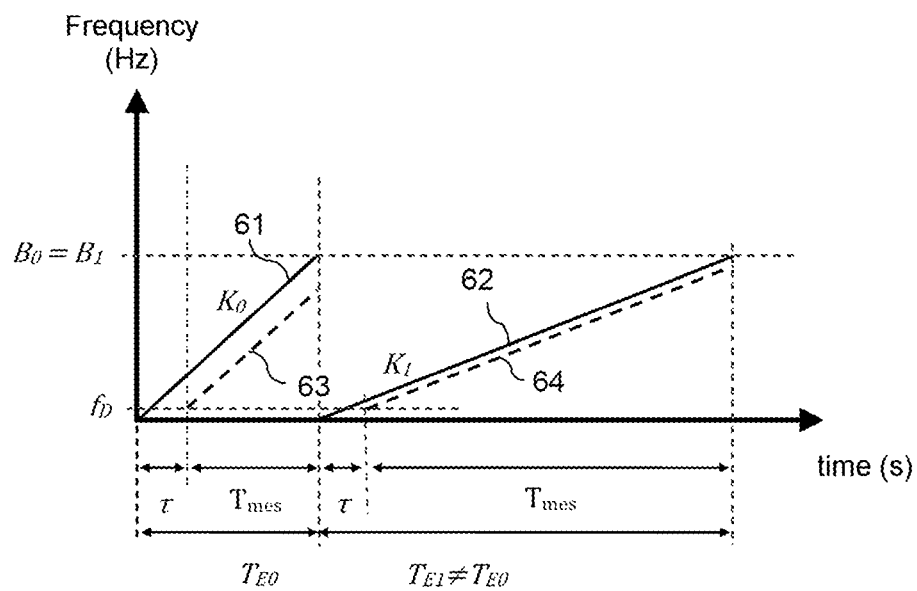

However it should be noted that, in another form of implementation of the method according to the invention, illustrated by FIG. 6b, it is possible to consider two frequency ramps 61 and 62 emitted with distinct durations $T_{E0}$ and $T_{E1}$, on one and the same band $B(B_0=B_1=B)$, so that the slopes $K_0$ et $K_1$ are determined by altering the respective values of $T_{E0}$ and $T_{E1}$.

In this case, the processing is carried out by applying an FFT on $N_0$ points to the signal $E^*_0(t)$ and on $N_1$ points to the signal $E^*_1(t)$ thereby making it possible to adjust $T_{E0}=N_0 \cdot T_{\acute{e}ch}$ and $T_{E1}=N_1 \cdot T_{\acute{e}ch}$ in such a way that $T_{E1}$ is a multiple of $T_{E0}$. Signals are thus processed by considering two distinct frequency resolutions $$R_{f0} = \frac{1}{T_{E0}} \text{ and } R_{f1} = \frac{1}{T_{E1}}.$$

It should be noted here that the spacing P1 is then defined by the frequency resolution $R_{f1}$ since the distance resolution is constant because there is emission of an identical frequency band $$B\left(r_D = \frac{c}{2\cdot B}\right).$$

This form of implementation, similar in its principle to the form described above, allows the value of the distance to be obtained more rapidly in the least fine resolution.

It is also possible, in a generalized manner, in a form of implementation analogous to the previous form, to envisage undertaking the emission of two frequency ramps 61 and 62 exhibiting distinct durations $T_{E0}$ and $T_{E1}$ and also distinct bands $B_0$ and $B_1$. It is thus possible to adjust the values of the slopes $K_0$ and $K_1$ by altering either the respective values of $T_{E0}$ and $T_{E1}$ and/or the respective values of $B_0$ and $B_1$.

Figure 7:
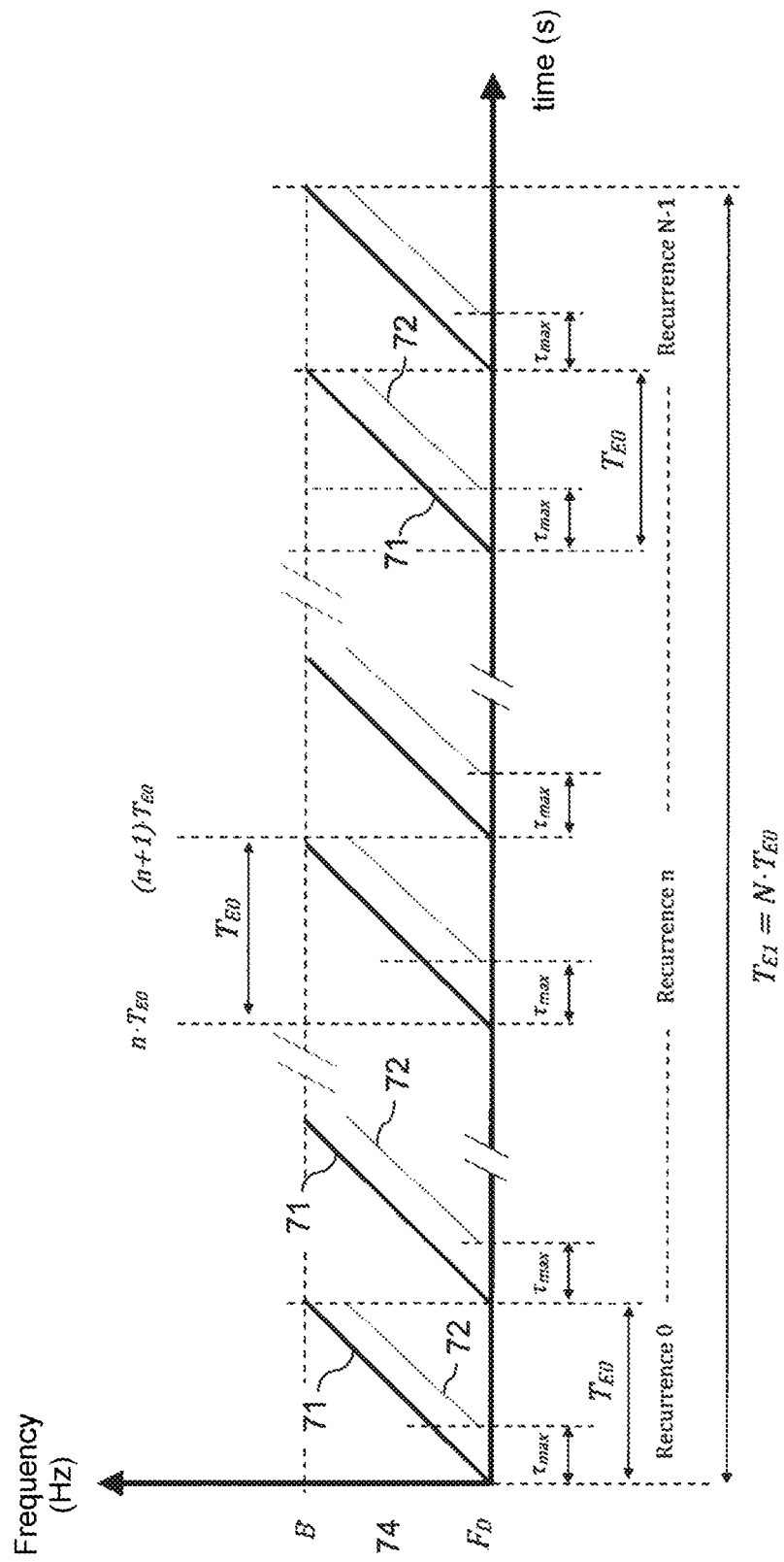
FIGS. 7 and 8, representations in a time-frequency frame of a second exemplary waveform allowing the implementation of the method according to the invention according to a second form of implementation.
Figure 8:
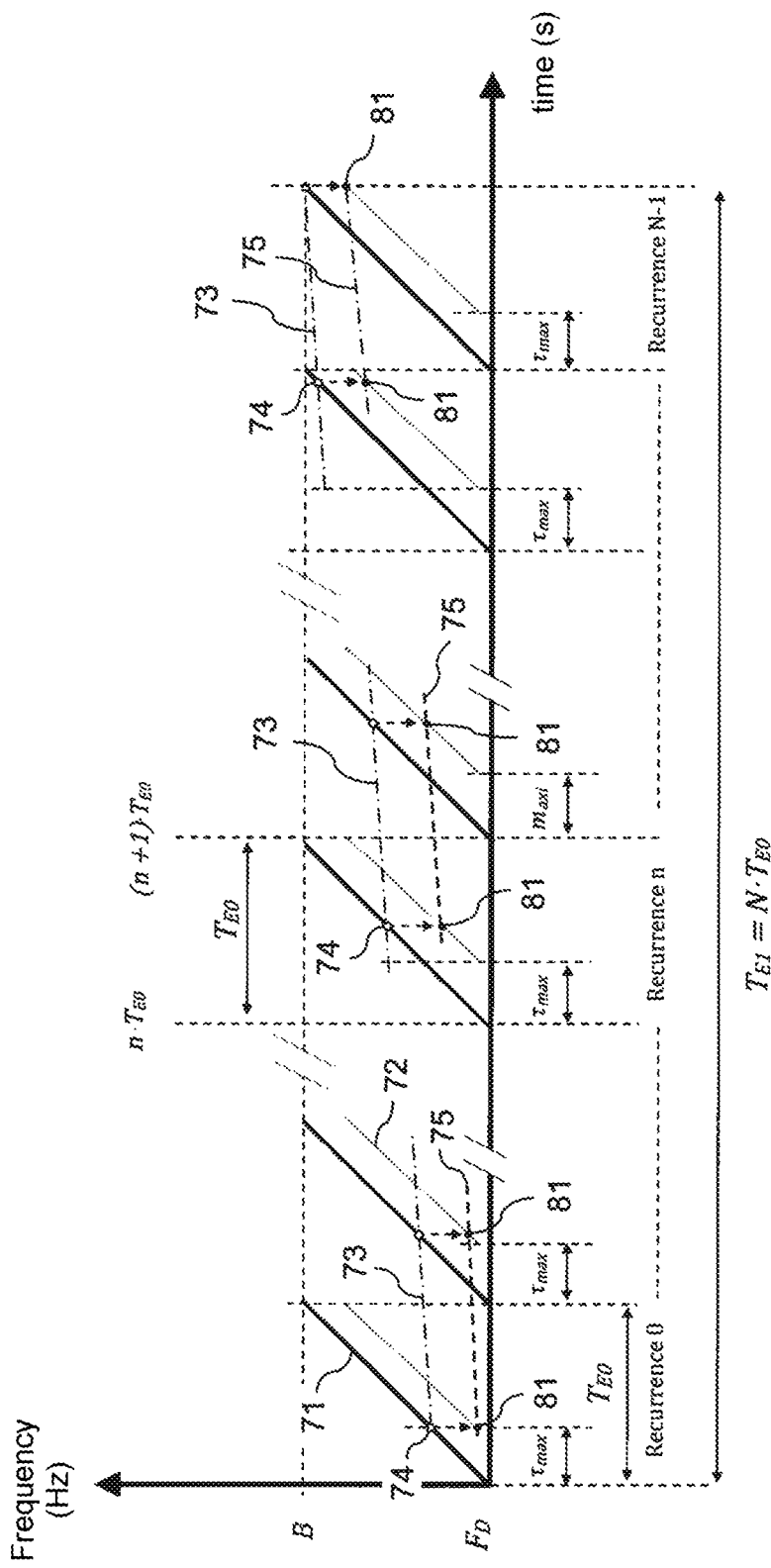

FIGS. 7 and 8 illustrate the operating principle of a second form of implementation of the method according to the invention.

This form of implementation consists in emitting in a recurrent manner, with a period $T_0$, a series of N identical elementary frequency ramps 71 of slope $K_0$ and of duration $T_{E0}$, the set of emitted ramps constituting a signal of duration $N \cdot T_{E0}$.

It consists thereafter in performing a double spectral analysis by FFT on N points:

a first spectral analysis on N points is carried out on the signal $E^*_0(t)$ obtained after sampling of $E_0(t)$ determined on the basis of the signal received $r_0(t)$, 73, after emission of a an elementary ramp $e_0(t)$, 71, of duration $T_{E0}$;

a second spectral analysis is carried out on a signal $E^*_1(t)$ consisting of N samples, each sample $E_1(t_n)$ corresponding, for a given instant $t_n$, to the value of the signal $E_0(t)$ determined on the basis of the signal $r_0(t)$ received for the elementary frequency ramp, 71, emitted at the nth recurrence. The second spectral analysis is thus carried out on a signal $E^*_1(t)$ determined on the basis of a signal $r_1(t)$, of duration $N \cdot T_{E0}$, consisting of the N samples 81 retained.

According to the invention, the N instants $t_n$ are chosen in such a way that for the recurrence n, n varying from 0 (first recurrence) to N−1 (Nth recurrence), the instant $t_n$ is expressed by:

$$t_n = n\cdot T_{E0} + n\cdot \frac{T_{E0}}{N} \qquad [29]$$

Accordingly, the N points 81 constituting the samples of the signal $r_1(t)$, each having as abscissa an instant $t_n$ in a time-frequency representation, correspond to N points aligned along a straight line of slope $K_1$ which is smaller than the slope $K_0$ characterizing the elementary ramps 71, $K_1$ being expressed by:

$$K_1 = \frac{K_0}{N} \qquad [30]$$

In this way an emission signal 73 of duration $N \cdot T_{E0}$ having the form of a frequency ramp $e_1(t)$ of slope $K_1$ is synthesized in a virtual manner.

Advantageously the corresponding reception signal, $r_1(t)$, 75, is then defined by N samples 81 of the signals $r_0(t)$, 72, corresponding to the value of the signal received at each instant $t_n$ subsequent to the emission of the frequency ramp 71 of slope $K_0$ of the $n^{th}$ recurrence.

This second form of implementation thus makes it possible, by emitting a single type of frequency ramps of slope $K_0$, to have, as in the case of the previous form of implementation, two signals $E_0$ and $E_1$, by implementing the double spectral analysis processing of $E^*_0(t)$ and $E^*_1(t)$ implemented by the method according to the invention. However, the formation of the signal $E_1(t)$, carried out in the course of step 32, appears different.

Thus, to form the signal $E^*_1(t)$, an aggregation is carried out of samples over N recurrences corresponding to the N elementary ramps 71 emitted.

It should however be noted that the aggregation of the samples over N recurrences must be done with a delay compensation proportional to the rank of the recurrence.

Indeed, if the signal $e_0(t,n)$ of the signal corresponding to an elementary ramp 71 of rank n (n varying from 0 to N−1) is considered, it is noted that this elementary ramp is defined for $t \in [0 + \tau_{max}; T_{E1}]$ by:

$$e_0(t,n) = e^{j\cdot 2\cdot \pi \cdot K_0 \cdot (t - n\cdot T_{E0} - \tau_{max})\cdot t} \qquad [31]$$

Accordingly, to perform the aggregation of the samples of the signals $E_0(t)$ over N recurrences, it is necessary to create a replica of the emitted wave $e_r(t,n)$ and to add, at each recurrence, a phase equal to $$n \cdot \frac{2 \cdot \pi}{N}$$

so as to apply it to the reception LO (Local Oscillator) of the radar receiver, in such a way as to be able to form a measurement signal whose period is $>T_{E0}$.

Thus, after phase shift of the LO, we obtain $e_r(t,n)$ and $r_0(t,n)$ which are given by the following relations:

$$e_r(t, n) = e^{i \cdot 2 \cdot \pi \cdots K_0 \cdot (t-n \cdot T_{E0} - \tau_{max}) \cdot t + n \cdot \frac{2 \cdot \pi}{N}} \quad [32]$$

$$r_0(t, n) = e^{i \cdot 2 \cdot \pi \cdots K_0 \cdot (t-n \cdot T_{E0} - \tau_{max} - \tau) \cdot t} \quad [33]$$

The signal $E^*_1(t)$ is thus defined, for $t \in [0+\tau_{max}, T_{E1}]$, by the following expression:

$$E^*_1(t) = \frac{e_r(t, n)}{r_0(t, n)} = e^{i \cdot 2 \cdot \Pi \left(K\tau t + \frac{n}{N}\right)} \quad [34]$$

It should be noted here, that in an advantageous manner the samples of the signals $E^*_0(t)$ aggregated over the N recurrences are tapped off at particular instants specific for each of the recurrences. Thus, for the nth recurrence, we tap off the sample corresponding to the instant $t_n$ defined by the relation:

$$t_n = n \cdot T_{E0} \left(\frac{N+1}{N}\right).$$

It may readily be noted that, if the samples of the signals $E^*_0(t)$ aggregated over the N recurrences are tapped off at identical instants $t_n = N \cdot T_{E0}$ for each recurrence, the signal $E^*_1(t)$ is then defined, for $t \in [0+\tau_{max}, T_{E1}]$, by the following expression:

$$E^*_1(t) = \frac{e_r(t_n, n)}{r_0(t_n, n)} = e^{i \cdot 2 \cdot \Pi \cdot n \left(K \cdot \tau \cdot T_{E0} + \frac{1}{N}\right)} \quad [35]$$

Accordingly, in the case where the period $$T_{E0} \cdot \frac{N+1}{N}$$

is smaller than $$\frac{1}{K \cdot \tau},$$

we can write $$E^*_1(t) = \frac{e_r(t_n, n)}{r_0(t_n, n)} = e^{i \cdot 2 \cdot \Pi \cdot n \left(\gamma + \frac{1}{N}\right)} \quad [36]$$

with $\gamma = K \cdot \tau \cdot T_{E0}$.

$E^*_1(t)$ therefore appears to be a signal of frequency $$F = \gamma + \frac{1}{N}$$

and we can write, for $$\frac{1}{K \cdot \tau} < T_{E0}:$$

$$F_{max} = \frac{1}{2 \cdot T_{E0}} \text{ and } F_{min} = \frac{1}{N \cdot T_{E0}} \quad [37]$$

On the other hand, if the samples of the signals $E^*_0(t)$ aggregated over the N recurrences are tapped off as indicated above, for distinct instants $t_n$, we can write $$E^*_1(t) = \frac{e_r(t, n)}{r_0(t, n)} = e^{i \cdot 2 \cdot \Pi n \left(\gamma + \frac{1}{N}\right)} \quad [38]$$

with $$\gamma = K \cdot \tau \cdot T_{E0} \cdot \left(\frac{N+1}{N}\right)$$

The signal $E^*_1(t)$ being defined on N points spaced apart by $$\frac{N+1}{N}.$$

$T_{E0}$, we note the existence of a scale factor equal to $$\frac{N}{N+1}$$

on the quantization or frequency F of the signal which is in this case defined, for $$\frac{1}{K \cdot \tau} < T_{E0} \cdot \left(\frac{N+1}{N}\right),$$

by the relation:

$$F = \left(\frac{1}{\gamma} + \frac{1}{N}\right) \cdot \frac{N}{N+1} \quad [39]$$

$F_{min}$ and $F_{max}$ then being defined by:

$$F_{min} = \frac{1}{(N+1) \cdot T_{E0}} \text{ and } F_{max} = \frac{N}{2 \cdot (N+1) \cdot T_{E0}} \quad [40]$$

It is thus noted that the samples collection principle implemented in the context of the invention advantageously makes it possible to increase the frequency resolution, without changing the parameters of the waveform that is used.

The invention claimed is:

1. A method for determining in real time the distance, d, from the ground of an aircraft by radar measurements, the said distance d being determined, for a span of distances extending up to a given distance $d_{max}$, with a given constant resolution $R_{d0}$;
    wherein it implements the following operations:
        the emission of at least two successive frequency ramps and the reception of the signals reflected by the ground subsequent to these emissions;
        the construction, on the basis of the reflected signals received of two signals $E_0(t)$ and $E_1(t)$ each corresponding to the reflected signal $r_0(t)$ or $r_1(t)$ originating from the successive emissions of two waveforms $e_0(t)$ and $e_1(t)$, after demodulation of the signals $r_0(t)$ and $r_1(t)$ by the corresponding wave $e_0(t)$ or $e_1(t)$ and sampling of the demodulated signal at a given frequency $F_{éch}$;
    the said waveforms $e_0(t)$ and $e_1(t)$ being represented in a "time-frequency" space by two frequency ramps exhibiting respective slopes of variation $K_0$ and $K_1$, on two frequency bands $B_0$ and $B_1$ whose ratio $B_1/B_0$ is a given integer number, the band $B_0$ being determined as a function of the distance resolution $R_{d0}$ by the relation:

$$B_0 = c/2R_{d0},$$

the slope $K_1$ being determined as a function of the distance $d_{max}$ by the relation:

$$K_1 = \frac{c}{2} \cdot \frac{F_{\acute{e}ch}}{2\alpha \cdot d_{1max}};$$

the slopes $K_0$ and $K_1$ being respectively given by the relations $$K_0 = B_0/T_{E0} \text{ and } K_1 = B_1/T_{E1}$$

where $T_{E0}$ and $T_{E1}$ represent the respective durations of emission of the waveforms $e_0(t)$ and $e_1(t)$;
        the application of an FFT, on N samples, to the signals $E_0(t)$ and $E_1(t)$ and determination of the spectral components $E_0$ and $E_1$ corresponding to the said signals, $E_0$ corresponding to the component of lowest frequency of the spectrum of $E_0(t)$;
        the determination, on the basis of the spectral components $E_0$ and $E_1$, of the distances measured $d_0$ and $d_1$ by means of the waveforms $e_0(t)$ and $e_1(t)$ corresponding respectively to the spectral components $E_0$ and $E_1$, $d_0$ and $d_1$ being given by the relations:

$$d_0 = \frac{c}{2} \cdot \frac{E_0}{\alpha K_0} \text{ and } d_1 = \frac{c}{2} \cdot \frac{E_1}{\alpha K_1}$$

the determination, on the basis of $d_0$ and $d_1$, of the distance d to be measured, d being given by the relation:

$$d = M \cdot d_{0max} + d_0$$

with $$d_{0max} = \frac{c}{2} \cdot \frac{F_{0max}}{\alpha K_0} = \frac{c}{2} \cdot \frac{F_{\acute{e}ch}}{2\alpha K_0} \text{ and } M = \text{INT}\left(\frac{d_1}{d_{0max}}\right) = \text{INT}(2 \cdot E_1 \cdot T_{\acute{e}ch}).$$

2. The method according to claim 1, wherein it comprises the following steps:
    a first step during which are determined the slopes $K_0$ and $K_1$, and frequency bands $B_0$ and $B_1$ characterizing the two signals $e_0(t)$ and $e_1(t)$ as well as the durations of emission $T_{E0}$ and $T_{E1}$ of these two signals; this first step being carried out while taking into account the following parameters:
        maximum distance measured: $d_{max}$,
        distance resolution required: $R_{d0}$,
        frequency of sampling of the signals received by the radar: $F_{éch}$,
        number N of points on which the spectral decomposition of the signals must be performed;
    a second step of emission during which:
        the radar emits at least two waves corresponding a chosen type of emission, at least one of these waves consisting of a frequency ramp of band $B_0$ and of slope $K_0$;
        the radar receives the reflected signals resulting from the reflection by the ground of the emitted waves;
        the signals $E_0(t)$ and $E_1(t)$ are formed on the basis of the reflected signals received;
    a third step during which are carried out the spectral decomposition by FFT on N points of the signals $E_0(t)$ and $E_1(t)$ and the determination of the spectral components $E_0$ and $E_1$;
    a fourth step during which is carried out the calculation of the distance d on the basis of $E_0$ and $E_1$.

3. The method according to claim 2, wherein the fourth step 34 comprises:
    a first sub-step of calculating the distance $d_1$ defined by:

$$d_1 = \frac{c}{2} \cdot \frac{G_1}{\alpha K_1}$$

where $G_1$ represents the integer part of the spectrum of $E1(t)$
    a second sub-step of calculating the scale factor M defined by:

$$M = \text{INT}\left(\frac{2E_1}{F_{\acute{e}ch}}\right);$$

a third sub-step of calculating the distance $d_0$ defined by:

$$d_0 = \frac{c}{2} \cdot \frac{H_0}{\alpha K_0}$$

where $H_0$ represents the integer part of the value of the first spectral line, $E_0$, of the spectrum of E0(t);

a fourth sub-step of calculating the distance d, defined by:
$d = M \cdot d_{0max} + d_0$.

4. The method according to claim 2, wherein the waveforms emitted by the radar in the course of the second step of the method consist of a first frequency ramp $e_0(t)$ of band $B_0$ and of slope $K_0$ followed by a second frequency ramp $e_1(t)$ of band $B_1$ and of slope $K_1$.

5. The method according to claim 4, wherein the signal $e_0(t)$ and the signal $e_1(t)$ have distinct durations of respective emission $T_{E0}$ and $T_{E1}$ and occupy one and the same frequency band B, so that their respective slopes $K_0$ and $K_1$ are expressed by:

$$K_0 = \frac{B}{T_{E0}} \text{ and } K_1 = \frac{B}{T_{E1}}.$$

6. The method according to claim 4, wherein the signals $E_0(t)$ and $E_1(t)$ are obtained after demodulation of the signals received $r_0(t)$ and $r_1(t)$ by the signals emitted $e_0(t)$ and $e_1(t)$, the signals $E_0(t)$ and $E_1(t)$ being thereafter sampled in the course of the third step at the frequency $F_{éch}$ so as to obtain the signals $E^*_0(t)$ and $E^*_1(t)$, the FFT spectral analysis of which is carried out.

7. The method according to claim 2, wherein the waveforms emitted by the radar in the course of the second step of the method consist of a recurrent string of N identical frequency ramps $e_0(t-nT_{E0})$, mutually shifted in time by a duration $T_{E0}$ equal to the emission time of a ramp, of band B and of duration $T_{E0}$.

8. The method according to claim 7, wherein for each of the N frequency ramps emitted, the signal $E_0(t)$ obtained by demodulation of the signal received by the signal emitted is sampled to obtain the corresponding signal $E^*_0(t)$, and then a signal $E^*_1(t)$ is constructed by considering a sample of the signal $E^*_0(t)$ formed for each of the N ramps emitted, the signal $E^*_1(t)$ consisting of the N samples thus tapped off.

9. The method according to claim 8, wherein for the nth frequency ramp $e_0(t)$ emitted the signal received $r_0(t)$ is demodulated by applying a phase shift equal to $$n \cdot \frac{2 \cdot \pi}{N}$$

to the local oscillator of the radar receiver.

10. The method according to claim 8, wherein for each of the N signals $E^*_0(t)$ formed, one taps off the sample corresponding the instant $t_n$ determined by the expression:

$$t_n = n \cdot T_{E0} + n \cdot \frac{T_{E0}}{N},$$

in which n represents the rank, in the string of frequency ramps emitted, of the frequency ramp n corresponding to the signal $E^*_0(t)$ considered.

* * * * *

UNITED STATES PATENT AND TRADEMARK OFFICE
CERTIFICATE OF CORRECTION

PATENT NO. : 11,300,678 B2
APPLICATION NO. : 16/528219
DATED : April 12, 2022
INVENTOR(S) : Thierry Mazeau et al.

It is certified that error appears in the above-identified patent and that said Letters Patent is hereby corrected as shown below:

In the Claims

In Claim 1, Column 17, Line 56, "$K_0 = {}^B\!{}_0/T_{E0}$ and $K_1 = {}^B\!{}_1/T_{E1}$" should be -- $K_0 = {}^{B_0}\!/T_{E0}$ and $K_1 = {}^{B_1}\!/T_{E1}$ --.

Signed and Sealed this
Fifth Day of July, 2022

Katherine Kelly Vidal
Director of the United States Patent and Trademark Office